Patented May 28, 1929.

1,715,337

UNITED STATES PATENT OFFICE.

JOHN M. COUGHLIN, OF KANSAS CITY, MISSOURI, ASSIGNOR TO SCALE SOLVENT & PRODUCTS COMPANY, A CORPORATION OF MISSOURI.

SCALE SOLVENT AND SEALING COMPOSITION.

No Drawing.　　Application filed January 21, 1927.　Serial No. 162,678.

My invention relates to scale solvents and more particularly to compositions having the dual nature of solvent and sealer for water supply systems and boilers.

My object is the production of a liquid combined solvent and sealer that will have improved qualities for these functions and that also may be safely introduced into pipe lines supplying water for cooking or drinking, or for any domestic purpose.

The new composition of matter that I offer as embodying my invention consists of a soluble sealer and solvent preferably silicate of soda, to which coffee is added, the composition to be prepared in a manner to be explained.

I produce my composition primarily for introduction into a stream of water circulating in pipe systems involving heat, and may provide proportions for various conditions for example for a steam producing circuit or a potable hot-water supply circuit, but I may adapt the composition for systems supplying unheated water.

Compositions for such purposes commonly comprise a soluble glass, and usually include sodium silicate, silicon and sodium oxide, elements which tend to dissolve and remove the scale and various sediments deposited by heated water on the interior surfaces of the pipes and that also having affinity for metals but not for themselves or for scale, tend to provide a thin protective coating on the said surfaces, and to fill and plug small openings, thus checking and preventing corrosion and deposition of scale. Caustic soda is often added to the conventional compositions for increasing the solvent effect, and tannic acid is added chiefly as a coloring agent. It is believed that the tannic acid also has an influence in the favorable result both as to removing deposits and as to providing a protective seal. Each of the two commonly added agents, caustic soda and tannic acid, is objectionable for use in systems supplying water in preferably potable condition.

The composition I offer, which includes the silicate elements previously well known in the industry, may receive the addition of caustic soda for extreme instances of demand for scale dissolving but I design it for relatively constant formula as providing a solvent and seal having no deleterious effect on the potability of water treated, and therefore as having a wide range of convenient and safe utility for hospitals, office buildings, hotels, apartments, dwellings, and in fact any situation where water heated for any use may be available and used for cooking or drinking.

I produce the composition having such utility by providing coffee as the coloring agent and the element contributing to favorable results, and being able therefore to dispense with the previously widely used tannic acid. I wish to call attention to the particular form in which I prepare the coffee for incorporation into the composition, though other methods may later be found also effective and convenient when study of the subject with data disclosed by the use of my invention has brought forth further knowledge of the reasons for the results which practical experience and application of general principles have attained. For example, an extract of coffee may be substituted in suitable proportions for my liquid coffee constituent.

Attention is called to an item of domestic science in this connection, namely, that vessels in which coffee is prepared sustain no scale deposits, and that the boiling of coffee in a tea kettle tends to remove the scale that may be present therein.

Having provided the silicate elements, I prepare the coffee constituent by the percolative production of coffee, using one-half pound of pulverized coffee in substantially one gallon of water for the provision of one gallon of the said coffee constituent, and transferring the coffee to the silicate, in proportions within definite limits and gauged by color factors, with reasonable promptness, within a few hours at the maximum. It is important that care be taken to secure the complete straining out of all grounds from the liquid coffee.

The said gauging of proportions by color factors within the definite limits of my formula is apparently required because of variation in the color and possibly in other qualities due to conditions which I do not here detail, merely stating my opinion that the functional qualities tend to vary directly as the color. I find that increasing or decreasing the proportion of coffee within a range of 25 percent from normal, measuring the adjustment inversely by the greater or less depth of color of the coffee, produces a satisfactory composition.

The coffee element contributes no adverse factor to the composition, and water that has been treated by my composition is potable, even though small portions of my composition may be present in the supply used for cooking or drinking.

My composition is produced in fifty gallon lots as a basis by providing substantially 40 gallons of a 42° Baumé solution of liquid silica, to which is added nine gallons of water and one gallon of fresh strained liquid coffee. Such composition is designed for introduction into a domestic, hotel, hospital, or office building potable hot water circulating system in ratio of one quart of the liquid composition to 10,000 gallons of water, and to be so introduced preferably every 24 hours. I may modify the composition for steam production systems by the provision of silicate of soda of 50° Baumé, and suggest the introduction of the composition into such steam system in the ratio of one quart thereof to 100 horse power boiler capacity each twelve hours of operation.

What I claim and desire to secure by Letters Patent is:

1. A composition for the purpose described, comprising a liquid silicate and an extract of coffee.

2. A composition of the class described, consisting substantially of silicate of soda and coffee.

3. A composition of the class described, comprising substantially a soluble glass and liquid coffee.

4. A scale solvent and sealer consisting of a 42° Baumé to 50° Baumé solution of soluble glass, an extract of coffee, and a diluent.

5. A leak-stopping composition comprising substantially 40 gallons of a 42° Baumé solution of silicate of soda, 9 gallons of water and 1 gallon of liquid coffee.

6. A scale solvent and sealer comprising a composition including substantially forty gallons of a 42° Baumé to 50° Baumé solution of soluble glass for sealing, and nine gallons of water, and one gallon of liquid coffee for dissolving scale and coloring the composition, the liquid coffee consisting of the extract from one-half pound of pulverized coffee beans.

7. The process of coloring a soluble glass and adapting the same for use in domestic water-circulating systems as a solvent and sealer, including the production of liquid coffee by the percolative method, straining the liquid coffee to remove solid particles, and adding the strained liquid coffee while fresh to the soluble glass.

In testimony whereof I affix my signature.

JOHN M. COUGHLIN.